United States Patent Office 3,485,882
Patented Dec. 23, 1969

3,485,882
STEAM-HYDROCARBON PROCESS OVER IRON-CHROMIUM CATALYST FOR SYNTHESIS GAS PRODUCTION
Howard V. Hess, Glenham, and Frank E. Guptill, Jr., Fishkill, N.Y., assignors to Texaco Inc., New York, N.Y., a corporation of Delaware
No Drawing. Filed Dec. 19, 1966, Ser. No. 602,546
Int. Cl. C01b 2/16; C07c 3/58
U.S. Cl. 260—672                              12 Claims

ABSTRACT OF THE DISCLOSURE

A process for producing synthesis gas or for the dealkylation of hydrocarbons by steam reforming a wide range of aromatic and aliphatic hydrocarbon fluids in the presence of a catalyst comprising the alloys of iron and chromium or their mixed oxides. The process is characterized by the use of a single stage multitemperature zoned reactor, unusually low steam to carbon ratios, and high space velocities.

---

The term "synthesis gas" refers to a mixture of gases composed primarily of hydrogen and carbon monoxide. Such gas mixtures, as produced by the process of this invention, may be used directly as feed stock in processes for the synthesis of methanol, hydrocarbons, or oxygenated organic chemicals. Furthermore, the product gas contains an unusually high percentage of hydrogen that may be recovered by additional steps not part of this invention. Hydrogen is used for the synthesis of ammonia, for hydrogenation, for the production of town gas, for the direct reduction of iron ores, and when liquefied as a high energy fuel.

Existing commercial methods for producing synthesis gas by steam reforming hydrocarbons are subject to shortcomings such as: high steam to carbon ratios (conventionally expressed as the mols of steam fed per atom of carbon present as hydrocarbon in the feed) increases fuel costs and which necessitate the use of larger reforming furnaces; feedstocks which are limited to high cost low molecular weight hydrocarbon gases or vaporized low boiling fluids to avoid clogging the catalyst bed with carbon; low space velocities which reduce yield; and nickel catalysts which are quickly poisoned and which require expensive pretreatment and desulfurization of the feedstocks.

By the process of the present invention, mixtures of hydrogen and carbon monoxide may be produced without th disadvantages mentioned above. Feedstocks may vary from low molecular weight gaseous hydrocarbons to hydrocarbons with boiling end points up to 600° F. Aromatic hydrocarbon feedstocks may be completely reformed to produce carbon monoxide and hydrogen or may be partially reformed or dealkylated. The composition of the product gas can be predetermined: for example, methane content may be varied from 0% under conditions favorable to reforming to 30% under dealkylation conditions; and the production of olefins may be completely retarded. Furthermore, the new process is continuous for long periods before regeneration of the catalyst is indicated. It is no longer necessary to vaporize hydrocarbons prior to feeding them into the reactor. In addition, feedstocks may contain moderate amounts of sulfur. In view of the above, the economic advantages of this new reforming process are substantial.

In accordance with the invention, a mixture of hydrocarbon fluid and water is fed into a chrome steel reactor having at least two temperature zones and containing an improved iron chromium catalyst. Operating conditions include: temperature range of about 70 to 1000° F. in a first temperature zone and about 1300 to 2000° F. in a second temperature zone, pressure range of about 0 to 600 p.s.i.g., and a space velocity range of about 200 to 3000 SCF per hour. Preferred steam to carbon ratios range from 0.9:1 to 2:1 and are unusually low.

It is therefore an object of this invention to provide a new and improved method for the production of a synthesis gas rich in carbon monoxide and hydrogen from a hydrocarbon fluid.

Another object of this invention is to provide an improved process for steam reforming a broad range of liquid and gaseous aromatic and aliphatic hydrocarbon feedstocks to produce synthesis gas.

A still further object of this invention is to provide an improved hydrocarbon steam reforming process that employs an improved long-acting low-cost catalyst.

Another object of this invention is to provide an improved steam reforming process to dealkylate hydrocarbons.

Still another object is to provide an economical process for producing synthesis gas of low methane and high hydrogen content by steam reforming a hydrocarbon fluid during a single pass at high space velocity over a conversion catalyst containing iron and chromium or their mixed oxides.

Yet another object of this invention is to provide a low cost continuous process for the production of a mixture of carbon monoxide and hydrogen gases of high purity starting with an untreated hydrocarbon feedstock.

A further object is to provide a new and improved catalytic process for the conversion of normally liquid saturated or olefinic hydrocarbons or sulfur containing hydrocarbon feedstocks including toluene, naphtha and kerosine boiling range hydrocarbons to a gas mixture rich in carbon monoxide and hydrogen, whereby carbon deposition is substantially avoided and steam requirements are drastically reduced.

A still further object is to provide a method for the production of a low cost high activity catalyst for the steam reformation of hydrocarbons, which is mechanically strong, and is both chemically and thermally stable.

Various other objects and advantages of this invention will become apparent to those skilled in the art from the accompanying description and disclosure.

The above objects are accomplished by the steam reforming of a hydrocarbon in the presence of an iron-chromium catalyst under conditions such that a gas mixture rich in hydrogen and carbon monoxide is produced. The principal reaction may be illustrated as follows:

$$C_nH_m + nH_2O = nCO + (0.5m+n)H_2 - \text{Heat}$$

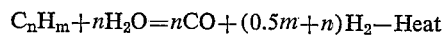

With stoichiometric amounts of water (1 mol of water for each atom of carbon present as hydrocarbon in the feed), the formation of synthesis gas by the process of this invention proceeds in an almost quantitative yield. In order to prevent the deposition of carbon on the catalyst and to suppress the formation of methane by the reaction of carbon monoxide and hydrogen, existing commercial methods require two to six times more steam than that used by the process of this invention. In this respect therefore, the low steam to carbon ratio used in this invention offers a decided economic advantage over existing processes. For example, it now has become feasible to make use of available low cost hydrocarbon feedstocks of high molecular weight. Furthermore, as another advantage of this process, the steam to carbon ratios are fairly stable. In contrast, the steam to carbon ratios of other ctatalytic steam reforming processes are affected by such parameters as temperature, pressure, and the composition of the hydrocarbon feedstock.

The catalyst used may be prepared by a variety of methods without departing from the scope of this invention. Such common techniques as precipitation and gel formation, impregnation of supports, ball mulling of mixed components, and pressure molding and tableting may be used to produce pellets of catalyst that will pass through a screen with for example, one-quarter inch openings.

For example, the following procedure was used to prepare iron chromium catalyst IC–1 having a composition on a weight basis of $Fe_2O_3$ about 90 to 96%, and $Cr_2O_3$ about 4 to 10%: sodium hydroxide was slowly added to a heated and agitated solution of ferrous sulfate and chromic acid in water. The resulting slurry of coprecipitated ferrous and chromous hydroxides was filtered, washed, and dried. The product was then roasted and oxidized at a temperature of 1800° F. to form a mixture of ferric and chromic oxides. Molding lubricant was added and the mixed oxides were then granulated, pelleted in a rotary tableting press, and calcined 8 hours at a temperature of 1650° F.

The mixed iron and chromium oxides may be supported on a porous alumina substrate by impregnating ¼″ diam. $Al_2O_3$ balls with a solution of the nitrates of iron and chromium, drying, and calcining at a temperature of 1000° F.

In another embodiment, the iron chromium catalyst IC–2 of this invention consisted of chrome steel chips ¼″ x ¼″ x 1/64″ thick made by machining chromium steel bar stock. The composition of these metal chips on a weight basis ranged as follows: Fe about 70 to 90%, Cr about 10 to 30% and Ni about 0–0.4%. A chemical analysis of used chrome steel chips confirms the belief that ferrous chromite ($FeO \cdot Cr_2O_3$) is formed on the surface of chips by their reaction with steam at a temperature of about 1000° F.

The following examples of the hydrocarbon steam reforming process of this invention are offered as a better understanding of the present invention and are not to be construed as unnecessarily limiting thereto.

297 ml./hr. of liquid benzene and 357 ml./hr. of distilled water were pumped into the top of a vertical tubular reforming unit. The reactor tube was 1½″ I.D. by 72″ long and was made from AISI Type 316 chrome steel (82 to 84% Fe and 16 to 18% Cr). Small ceramic refractory rings were packed into the tube 1 foot from each end.

The center portion of the tube was loaded with catalyst-iron chromium chips ¼″ x ¼″ x 1/64″ thick having the following composition by weight: Fe—73.5%, Cr—26.1% and Ni—0.4%. External electric heaters were used to jacket the tube and to provide two temperature zones. The top 1 ft. long section of the reactor tube, containing refractory rings but no catalyst was held at a temperature of 805° F. The remainder of the tube was held at a temperature of about 1420° F. The volume of $H_2+CO$ in the product gas per bulk volume of catalyst per hour (defined as space velocity) was 813. The steam to carbon ratio was 1:1. Product gas and residual liquid from the reactor were separated in a water jacketed steel separator. 37.8 s.c.f./hr. of mixed product gases were taken off overhead through a pressure control valve that maintained a back pressure on the system of 29 p.s.i.g. All of the benzene was converted to product gas. About 33 grams per hour of water were drawn off the bottom of the separator. The product gas had the following molar composition: $H_2$—61.4%, CO—33.7%, $CH_4$—0.7%, $CO_2$—4.2% and $C_2H_4$—0%.

The following tabulation of data (Table I) shows additional results obtained for steam reforming, by the process of this invention, other liquid hydrocarbons such as: n-heptane in Runs 1 and 2, light straight run naphtha in Runs 3 and 4, and toluene in Runs 5 and 6. Runs 2, 4 and 6 were made with catalyst IC–2 comprising iron chromium pellets of the previously described mixture of iron oxide and chromium oxide. Runs 1, 3 and 5 were made with catalyst IC–1 comprising iron chromium chips of the previously described oxidized chrome steel composition.

Dealkylation of hydrocarbons can be effected by the process of this invention. As an example, the data in Table I, Run No. 6 shows the demethylation of toluene to produce benzene. 66.7% of the toluene feed disappeared. 85.2% of the toluene that disappeared was converted into benzene. The balance was converted into a gas mixture having the analysis shown in Table I.

As an example of the resistance that the catalyst of this invention has to being poisoned by sulfur bearing feedstocks, reference is made to the data shown in Table I for Run No. 3. Although the naphtha feedstock contained 132 p.p.m. of sulfur, the duration of that run exceeded 65 hours and conversion ratios were high. Conventional processes require additional, costly steps to desulfurize the naphtha to about 3 p.p.m. sulfur; and, even then they require regeneration of the catalyst after brief on-stream periods and total replacement after one year's usage because of reduction in activity.

TABLE 1

| | Run No. | | | | | |
|---|---|---|---|---|---|---|
| | 1 | 2 | 3 | 4 | 5 | 6 |
| | n-Heptane | | LSR-Naptha | | Toluene | |
| Feed HC: | | | | | | |
| HC, ml./hr | 145 | 726.1 | 102.9 | 917.6 | 133 | 249 |
| $H_2O$, ml./hr | 128 | 626.9 | 104.2 | 755.6 | 160 | 290 |
| Catalyst | IC–1 | IC–2 | IC–2 | IC–2 | IC–1 | IC–2 |
| Cat. Vol., ml | 1,710 | 1,000 | 1,300 | 1,085 | 1,710 | 1,200 |
| Temperature, ° F.: | | | | | | |
| First zone | 800 | 800 | 80 | 728 | 821 | 80 |
| Second zone | 1,537 | 1,502 | 1,500 | 1,603 | 1,536 | 1,320 |
| Pressure, p.s.i.g | 102 | 1 | 33 | 15 | 2.8 | 500 |
| Space velocity, outlet, v./hr./v | 257.5 | 2,528 | 198.3 | 2,160 | 261.5 | [1] 0.207 |
| Prod gas, s.c.f.h | 16.46 | 93.3 | 10.51 | 82,69 | 16.49 | 10.4 |
| Mol percent: | | | | | | |
| $H_2$ | 79.44 | 71.3 | 62.6 | 63.20 | 60.6 | 55.8 |
| CO | 15.03 | 24.0 | 24.0 | 26.93 | 35.2 | 4.3 |
| $CH_4$ | 2.86 | 3.4 | 8.2 | 7.23 | 1.7 | 15.2 |
| $C_2H_4$ | 0 | 0.2 | 0.3 | 0 | 0 | 0 |
| $CO_2$ | 2.65 | 1.2 | 4.7 | 2.64 | 2.0 | 24.4 |
| Liquid products: | | | | | | |
| HC, gm./hr | 0 | 0 | 0 | 0 | 3 | [2] 274 |
| $H_2O$ gm./hr | 31 | 0.78 | 22.9 | 25.6 | 9 | 146 |
| Conversion $H_2+CO$ percent: | | | | | | |
| Basis HC | 63.98 | 76.7 | 68.83 | 65.6 | 82.75 | |
| Basis $H_2O$ | 91.00 | 76.8 | 74.35 | 106.2 | 84.43 | |
| Steam/carbon (mol) | 1.01 | 1.00 | 1.19 | 0.964 | 1.01 | 0.98 |
| Duration, hrs | 14 | 32 | 65 | 17 | 10 | 12 |

[1] Liquid hourly space velocity (LHSV) ml./hr toluene per ml. catalyst.
[2] Benzene 58.8 weight percent and toluene 40.9 percent.

The process of the invention has been described generally and by examples with reference to synthesis gas of particular compositions for purposes of clarity and illustration only. It will be apparent to those skilled in the art from the foregoing that the process disclosed herein can be used to prepare synthesis gas of various compositions, without departure from the scope of the invention.

What is claimed is:

1. A process for producing synthesis gas by reacting hydrocarbon fluids with $H_2O$ in the presence of an iron chromium catalyst, which process comprises mixing said reactants at a temperature of about 70–1000° F. and a pressure of about 0–600 p.s.i.g., and contacting the mixed reactants at a temperature of about 1300 to 2000° F. with a catalyst in the form of pellets, particles or chips comprising an iron concentration of about 70 to 96 wt. percent, a chromium concentration of about 4–30 wt. percent, and a nickel concentration of about 0–0.4 wt. percent, and having a surface comprising the oxides of iron and chromium.

2. The process as described in claim 1 wherein said catalyst is composed of iron chromium chips or particulate form and having an iron content of about 70–90%, a chromium content of about 10–30%, and a nickel content of about 0–0.4% by weight, and wherein said catalyst is surface-oxidized by reaction with steam at elevated temperatures of at least 100° F.

3. A process for producing synthesis gas reacting hydrocarbon fluids with $H_2O$ in the presence of an iron chromium catalyst, which process comprises mixing said reactants at a temperature of about 70–1000° F. and a pressure of about 0–600 p.s.i.g., and contacting the mixed reactants at a temperature of about 1300 to 2000° F. with a catalyst in the form of pellets comprising $Fe_2O_3$ about 90–96 wt. percent and $Cr_2O_3$ about 4–10% by weight.

4. The process as described in claim 3 wherein said catalyst is supported on a porous alumina substrate.

5. A process for the production of a gas mixture comprising $H_2$ and CO which process comprises mixing a normally liquid hydrocarbon with water in a ratio of 0.9–2 mols of water for each atom of carbon present in the hydrocarbon feedstock, preheating in a reactor said mixture to a temperature of about 800 to 1000° F., and contacting said reactants at a temperature of about 1300 to 2000° F. with a catalyst in the form of particles, pellets or chips and comprising an iron concentration of about 70 to 96 wt. percent, a chromium concentration of about 4–30 wt. percent, and a nickel concentration of about 0–0.4 wt. percent, and having a surface comprising oxides of iron and chromium at an hourly space velocity of about 200 to 3000 volumes of $CO+H_2$ gas product per volume of catalyst present.

6. A process as described in claim 5 wherein said catalyst comprises chrome steel chips surface-oxidized by reaction with steam at elevated temperatures of about 1000° F. and having an iron content of about 70–90% by weight and a chromium content of about 10–30% by weight.

7. A process for the production of a gas mixture comprising $H_2$ and CO which process comprises mixing a normally liquid hydrocarbon with water in a ratio of 0.9–2 mols of water for each atom of carbon present in the hydrocarbon feedstock, preheating in a reactor said mixture to a temperature of about 800 to 1000° F., and contacting said reactants at a temperature of about 1300 to 2000° F. with a catalyst comprising $Fe_2O_3$ about 90–96 wt. percent and $Cr_2O_3$ about 4–10% by weight.

8. A process for producing an aromatic hydrocarbon by reacting an alkyl-aromatic hydrocarbon fluid charge stock with $H_2O$ in the presence of an iron chromium catalyst, which process comprises mixing said reactants at a temperature in the range of about 70–1000° F. and a pressure in the range of about 0–600 p.s.i.g., and contacting the mixed reactants at a temperature in the range of about 1300 to 2000° F. with a catalyst in the form of pellets, particles, or chips comprising an iron concentration of about 70 to 96 wt. percent, a chromium concentration of about 4–30 wt. percent, and a nickel concentration of about 0–0.4 wt. percent, and having a surface comprising the oxides of iron and chromium.

9. The process of claim 8 in which the charge stock comprises toluene and the product comprises benzene.

10. A process for producing an aromatic hydrocarbon by reacting an alkyl-aromatic hydrocarbon fluid charge stock with $H_2O$ in the presence of an iron chromium catalyst, which process comprises mixing said reactants at a temperature in the range of about 70–1000° F. and a pressure in the range of about 0–600 p.s.i.g., and contacting the mixed reactants at a temperature in the range of about 1300 to 2000° F. with a catalyst in the form of pellets comprising $Fe_2O_3$ about 90–96 wt. percent and $Cr_2O_3$ about 4–10% by weight, and wherein the steam to carbon mol ratio is about 0.9–2 to 1.

11. A process for producing an aromatic hydrocarbon by reacting an alkyl-aromatic hydrocarbon fluid charge stock with $H_2O$ in the presence of an iron chromium catalyst, which process comprises mixing said reactants at a temperature in the range of about 70–1000° F. and a pressure in the range of about 0–600 p.s.i.g., and contacting the mixed reactants at a temperature in the range of about 1300 to 2000° F. with a catalyst in particulate form or chips whose surfaces are oxidized by reaction with steam at elevated temperatures of at least 1000° F. and comprising iron 70–90 wt. percent, chromium 10–30 wt. percent and nickel 0–0.4% by weight and the steam to carbon mol ratio is about 0.9–2 to 1.

12. As a new composition of matter useful for the catalytic steam reforming or dealkylation of hydrocarbons, a chrome iron alloy catalyst in particulate form or chips and surface-oxidized by reaction with steam at elevated temperatures of at least 1000° F. and comprising iron 70–90 wt. percent, chromium 10–30 wt. percent, and nickel, 0–0.4% by weight.

References Cited

UNITED STATES PATENTS

| | | | |
|---|---|---|---|
| 2,067,729 | 1/1937 | Porter | 23—212 |
| 3,057,689 | 10/1962 | McEvoy et al. | 48—196 X |
| 3,291,850 | 12/1966 | Carson | 260—672 |
| 3,388,074 | 6/1968 | Reitmeier | 252—373 |

DELBERT E. GANTZ, Primary Examiner

G. E. SCHMITKONS, Assistant Examiner

U.S. Cl. X. R.

23—212; 48—214; 252—373, 465, 470